(12) United States Patent
Erdmann

(10) Patent No.: US 8,949,889 B1
(45) Date of Patent: Feb. 3, 2015

(54) PRODUCT PLACEMENT IN CONTENT

(75) Inventor: David Erdmann, Edmonds, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/544,855

(22) Filed: Jul. 9, 2012

(51) Int. Cl.
*H04H 60/33* (2008.01)
*H04H 20/14* (2008.01)
*H04H 60/29* (2008.01)
*H04N 7/10* (2006.01)
*H04N 7/025* (2006.01)

(52) U.S. Cl.
USPC ........ 725/34; 725/9; 725/22; 725/32; 725/33; 725/35; 725/36

(58) Field of Classification Search
CPC .......... H04N 21/23424; H04N 21/454; H04N 21/2547; H04N 21/26241; H04N 21/4316; H04N 21/4331; H04N 21/458
USPC ......................................................... 725/34
See application file for complete search history.

(56) References Cited

U.S. PATENT DOCUMENTS

| | | | |
|---|---|---|---|
| 7,715,448 B2* | 5/2010 | Cheng et al. ................. | 370/528 |
| 8,312,486 B1 | 11/2012 | Briggs et al. | |
| 8,458,053 B1 | 6/2013 | Buron et al. | |
| 2001/0023436 A1* | 9/2001 | Srinivasan et al. ............ | 709/219 |
| 2004/0194123 A1* | 9/2004 | Fredlund et al. .................. | 725/9 |
| 2008/0271067 A1* | 10/2008 | Li et al. ............................. | 725/32 |
| 2009/0157450 A1 | 6/2009 | Athsani et al. | |
| 2009/0327346 A1 | 12/2009 | Teinila et al. | |
| 2010/0281499 A1* | 11/2010 | Harville ......................... | 725/32 |
| 2010/0287588 A1* | 11/2010 | Cox et al. ....................... | 725/40 |
| 2011/0035769 A1* | 2/2011 | Candelore et al. .............. | 725/32 |
| 2011/0219402 A1* | 9/2011 | Candelore et al. .............. | 725/34 |
| 2012/0192226 A1* | 7/2012 | Zimmerman et al. .......... | 725/34 |
| 2012/0271684 A1 | 10/2012 | Shutter | |
| 2012/0272256 A1 | 10/2012 | Bedi | |
| 2013/0152125 A1* | 6/2013 | Xiong et al. .................... | 725/34 |

OTHER PUBLICATIONS

Amazon, product web page: http://www.amazon.com/Nicholas-Sparks/, dated: Sep. 5, 2010, http://web.archive.org/web/20100905192229/http://www.amazon.com/Nicholas-Sparks/e/BOOOAPGF36, and http://web.archive.org/web/20100905111913/ http://www.amazon.com/Safe -Haven-Nicholas-Sparks/dp/044654759X, 5 pages.
Amazon, product web page: http://www.amazon.com/Classics-DVD/, dated: Sep. 1, 2011, http://web.archive.org/web/20110401221057/http://www.amazon.com/Classics-DVD/b?ie=UTF8&node=163345 and http://web.archive.org/web/20110401203536/http://www.amazon.com/Ten -Commandments-Two-Disc-Special-Bluray/dp/B004IK30LE, 2 pages.

(Continued)

*Primary Examiner* — Justin Shepard
(74) *Attorney, Agent, or Firm* — Thorpe North & Western LLP

(57) ABSTRACT

Technology is described for personalizing a product placement in content. The method may include identifying a dynamic location in the content available for the product placement. A user profile may also be identified. The product placement may be selected based on the dynamic location identified in the content and the user profile. The product placement for the dynamic location identified in the content may then be provided.

21 Claims, 9 Drawing Sheets

(56) References Cited

OTHER PUBLICATIONS

Schubas product web page: http://web.archive.org/web/20100723152545/http://www.alexband.net/page/5488083:Page:194 date: Jul. 21, 2010, 1 page.

Start-up Watch Company of the Day: Nearbuy Systems brings microlocation solutions to retail customer,Author Jim Nichols, Jan. 31, 2011, http://ad-tech.blogs.imediaconnection.com/2011/01/31/start-up-watch-company-of-the-day-nearbuy-systems-bringsmicrolocation-solutions-to-retail-consumers/, 2 pages.

\* cited by examiner

PRODUCT PLACEMENT IN CONTENT

BACKGROUND

Media entities that create, produce, and distribute media content such as video programs, audio programs, electronic books, electronic magazines, electronic newspapers, electronic games, and similar media content desire to receive compensation for the work performed in creating such media content. Compensation for creating the media content may sometimes be collected by using investment funds, advertising models, or other compensation models.

In an investment model, media investors may provide upfront investment funds to produce media content (e.g., a movie, video, book, or audio program). The media investors hope to recover the investment and make a profit on the original investment through ticket sales, home video sales, television broadcasts, video subscription services, retail purchases, and merchandise sales. However, the risk of recovering funds invested in the creation of media content may often be high.

Revenues may also be earned by the media entities using advertising oriented models. Video or audio programs may be monetized by providing advertising supported content or by inserting advertisements at defined points in the media content. For example, advertisement video segments may be inserted between video content at the beginning, middle, end, every 15 minutes, or at other defined time points in the video content. In another model, product placements provided in a movie, video, or audio segment may provide revenue to the media entities or content creators by subtly or even overtly promoting an advertiser's product and/or service in the media content. The advertiser may pay to have a product package, brand image, message, logo, or advertisement placed in media content (e.g., movie or video). Payment may be provided upfront for the product placements or payment may be geared to defined metrics that the media content achieves.

DETAILED DESCRIPTION

Figure 1:
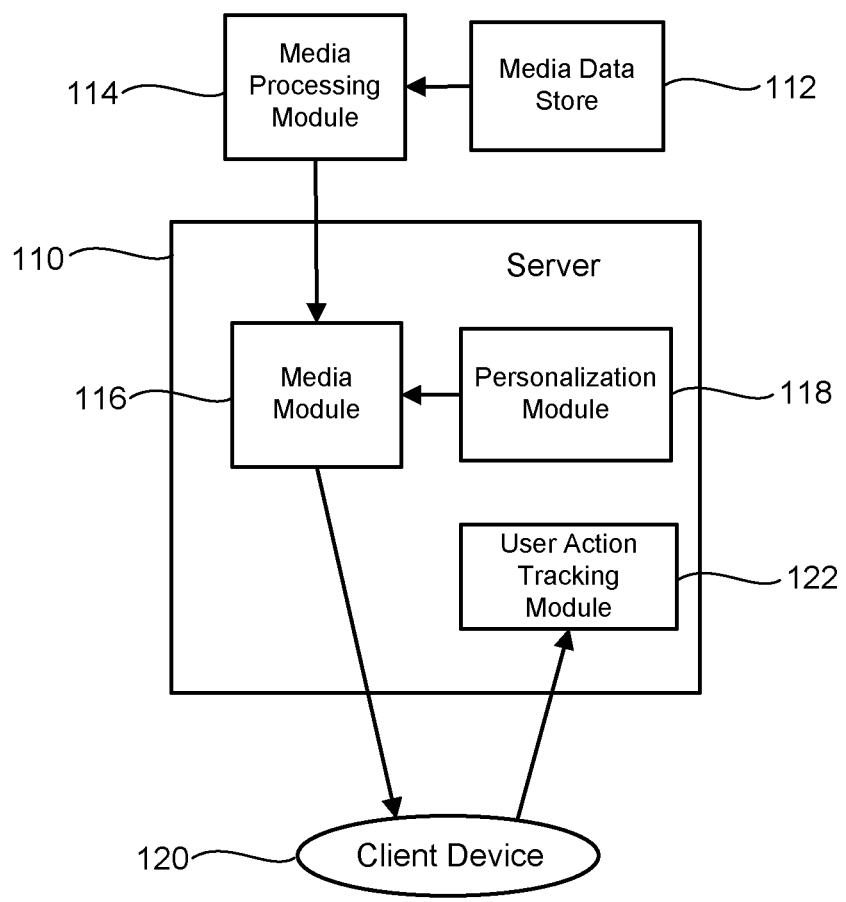
FIG. 1 is a block diagram illustrating an example of a system to provide a product placement in media content.

A technology is described for personalizing a product placement in media content. Product placement may be initiated by identifying a dynamic location in the media content where product placement is available. For example, the technology may identify a dynamic location that includes a time within the media content and/or an area within media content frame(s) (e.g., video frames) where a product placement may be placed into or overlaid onto the media content. In addition, a dynamic location may be a location for a product placement (e.g., stationary product placement) in the media content that is dynamically located across multiple points in the media content frames. Once these instances are identified, the technology may select product placements to be included in the media content based on, for example, information known about the person viewing the media. Media content may include video, audio, text or other content consumable by a user. The product placement may be any type of marketing message, product packaging image, advertisement, logo, brand image, product offering, service offering, or presentation of a product in visual, audible or text formats.

A user profile may be identified for the user who will be consuming the media content. In addition, a product placement may be selected from a product placement data store based on the dynamic location identified in the media content and the user profile. The product placement may then be provided for the dynamic location identified in the media content. The personalized product placement for the user may be placed or overlaid at the dynamic location identified in the media content by a client device that may retrieve the product placement from a product placement media data store. User actions taken as a result of consuming the product placement may also be recorded and these user actions may be defined as impact events. Recording the user's actions may track the impact of the product placement on a user viewing the product placement in the media content.

In a specific example configuration, the technology may dynamically select a product placement in video being viewed by a user. In one instance, the media content is associated with one or more media content tags. These media content tags may indicate a dynamic location in one or more frames of the video where a product placement is available. For example, suppose a user rents a movie from an on-demand video service. Often times a user is requested to register a client device with the on-demand video service for subsequent authentication of the client device. It may therefore be possible to associate a user profile with the registered client device. The product placement may be retrieved and placed into the media content by the client device before the media content is presented to the viewer. Alternatively, the product placement may be rendered into the media content for storage and later consumption. In one example scenario, a user profile may contain information indicating that the viewer likes fashionable shoes and the color red. Based on this information, when a shoe is displayed as a product placement in the media content on the client device, the shoe may have the user's favorite brand in the color red (the same product placement may be a different color for a different user) at the pixel size and time period for the video frames defined by the media content tag.

Viewer actions taken as a result of consuming the product placement in the media content may be recorded. For example, the impact of a viewer seeing a product placement in a video may be recorded. An action taken by the viewer of the media content may be recorded to see what impact the product placement had. Examples of such impact events include recording an online store access, a product purchase, interacting with an advertisement, identifying a physical location of a user, and similar events that occur within sometime after the product placement is placed and rendered in the media content.

FIG. 1 is a block diagram illustrating an example of a system for enabling product placement in media content. A server 110 may be provided with modules for providing a personalized product placement that may be combined into media content. The server may be a single server, a distributed server environment, a server farm, or any computing device or group of computing devices that may serve requests from other computing devices or programs.

A media data store 112 may store the media content for the server. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media. The media content stored by the media storage module may be video content, audio content, text content or another type of media content. Examples of media content may include full-length movies, video clips, video trailers, television programs, animated programs, audio books, pod casts, radio programs, books, magazines, articles, RSS (Really Simple Syndication) feeds, live video events, still image slide shows, and other types of media content that may be presented to a user.

A media processing module 114 may receive the media content from the media data store 112. The media processing module 114 may identify a dynamic location, time aspect and/or an area of the media content available for a product placement (e.g., visual, audible or text) and may create a media content tag that defines the dynamic location and/or time duration across multiple frames. The media data store 112 may be in communication with the media processing module 114 across a networked communication channel to access the media content. Examples of a networked communication channels may include a LAN (Local Area Network), WAN (Wide Area Network), an Internet connection, a Storage Area Network using Fiber Channel communications, a direct cable link, or another network channel. The media processing module 114 may be in communication with the server 110 as illustrated or integrated with the server. In some instances, the media content stored in media data store 112 has already been associated with media content tags by another entity (e.g., the studio providing the video). In such cases, media processing module 114 may not be included.

A personalization module 118 may be used to provide a user profile for use in personalizing a product placement. The user profile may include information about the user including: user supplied information, web browsing behavior, online and offline purchasing history, search history, a social graph (network of friends, relatives, work associates, etc.), friend's behavior and purchase history, demographics, desired brands, customer segments (e.g., early product adopter, luxury purchaser, mother, etc.), and similar user profile information. Some user profile information may be supplied directly by the user. For example, an interface may allow a user to create and manage a user profile with the user's own personalized information. Such information and preferences may be contained in the user profile and stored in a data store. For example, user provided information may include: age, gender, income, location information (address, city, state, etc.), phone numbers, personal interests, memberships in social networks, favorite brands, favorite colors, and similar personal information. In another configuration, an electronic interface, such as an application programming interface (API), may be provided for an executable program to submit user data to the personalization database as provided by the user or even a third party. The personalization module 118 may request information from user profiles from a separate data store that is in communication with the server 110. Alternatively, the personalization module 118 may store information for user profiles, such as customer segments for the user profiles, or the personalization module 118 may store limited information from the user profiles. The personalization module 118 may be integrated into the server or the personalization module may be located on a computing device that is independent of the server while maintaining communications with the server 110.

A media module 116 may receive media content from the media processing module 114 that includes the media content tags. The media module 116 may select the product placement using the media content tag and/or the user profile from the personalization module 118 and send the selected product placement to the client device 120. In one example, the selected product placement may be a product placement tag. In other words, the media module 116 may send the product placement and media content tag associated with the media content to the client device 120 to be displayed to a user. A client device 120 may be a device such as, but not limited to, a desktop computer, a laptop, a tablet, a mobile device, a television, a cell phone, a smart phone, a hand held messaging device, a set-top box, a gaming console, a personal data assistant, an electronic book reader, heads up display (HUD) glasses, a car navigation system, or any device with a display that may receive and present the media content.

The client device 120 may incorporate the product placement into the media content based on the media content tag. For example, product placement media content may be retrieved by the client device and be placed in the media content by the client device 120 at the dynamic location in the media content specified by the media content tag. The client device 120 may communicate with the server over any appropriate network, including an intranet, the Internet, a cellular network, a local area network (LAN), a wide area network (WAN), a wireless data network, or a similar network or combination of networks.

A user action tracking module 122 may be associated with the server. The user action tracking module 122 may track actions taken by a user in response to the presentation of a product placement to the user. In one configuration, the user action tracking module integrated into the server 110. Alternatively, the user action tracking module 122 may be located in a separate computing environment or server, in which case the user action tracking module may be in network communication with the server.

Certain processing modules may be discussed in connection with this technology. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that is hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Figure 2:
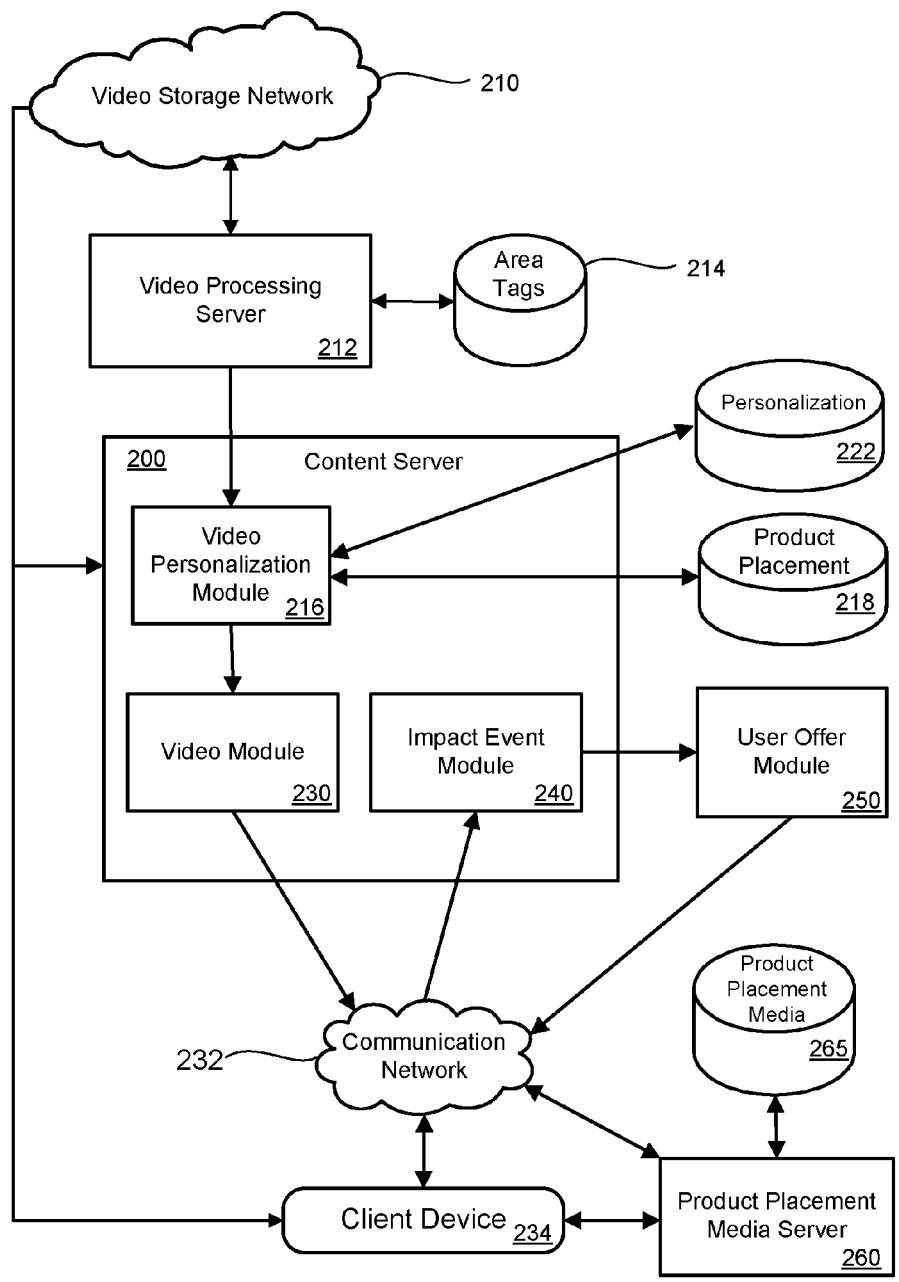
FIG. 2 is a block diagram illustrating a more detailed example of a system to provide a product placement into media content.

FIG. 2 illustrates a system for personalizing product placements for media content. Product placements for a specific example type of media content, namely video content (hereinafter "video content" or "content") will be discussed. The product placements may be personalized so that the product placements are targeted to users associated with requests for the video content. Dynamic personalization may allow the product placements to be changed and even customized upon request of the user or an advertising party. This technology also provides the ability to record and analyze a user's actions with respect to product placements in video content (e.g., movies). Furthermore, the impact that a product placement has on individuals that view the video content may be recorded.

A content server 200 may be provided to host modules for personalizing the product placement for the video content. In some configurations, modules may not be hosted by the content server 200 but the content server 200 may be in communication with any modules that are located in a separate server or computing platform. The content server may have computer hardware including a processor and computer memory to enable the modules to be executed. The content server 200 may include any appropriate hardware and software for interfacing with data stores, as needed, to execute aspects of applications for the client device, and the content server 200 may even handle substantial amount of the data access and business logic for modules or applications on the content server 200. In addition, the content server 200 may provide access control services in cooperation with the data stores, and the content server may generate data structures, tags, text, graphics, audio and/or video to be transferred to the client device 234. While this example content server 200 is shown as a single server, there may be several servers, layers, components, processes or elements which may be combined together or configured to interact to perform processing tasks and data access tasks, such as accessing the data stores.

A video storage network 210 may be configured to store video content that is desired to be consumed by viewers. The video content may be, by way of example only, full length movies, video clips, movie trailers, slow motion video, live video, or video of any length or quality. The video storage network 210 may use a cloud storage network, a SAN, network attached storage (NAS), a locally located storage server, a remotely located storage server, or any storage system capable of storing the desired video content. Such storage systems or services may be accessed for uploading and downloading of video data through an application programming interface (API), a cloud storage gateway, or through a web-based interface.

A video processing server 212 may be provided which accesses video content from the video storage network 210. In one example, the video content may be processed by the video processing server 212 in order to identify areas and areas in time intervals of the video content available for product placements in an automated manner. A more specific type of a media content tag is an area tag (hereinafter "area tag"). Area tags may be created for each location, time interval, and/or area identified in the video content, and an area tag may represent one or more product placements in the location. Area tags may also define whether the product placement based on a specific user interest may be placed into the video content, the size of the screen real estate available, the type of placement available (e.g., the placement is defined as can or bottle sized), or similar definitions. The area tags may be stored in an area tag data store 214. The video processing server 212 may also provide a manual mode with a graphical user interface (GUI) that allows a designer or user to specify which areas in the video content are prime for the product placement (e.g. advertising) and the GUI may receive input as video content is reviewed by the designer, as some areas may be more suitable than others for product placement.

As discussed above, area tags may include a time, time interval, area and/or a location where the product placement may be inserted. For example, an area tag may indicate that a certain type of product placement may be located in designated areas of the video (e.g., an M pixel by N pixel area) during a 30 second interval (e.g., from a timestamp of 10':30" to 11' in the video content). If the product placement needs to be graphically transformed, such as scaled, rotated, or translated during the video frame, an area tag may also provide, in some instances, additional parameters (e.g., transformation speed and angle for the product placement).

In one example configuration, the video processing server 212 may be controlled by a third party (e.g., a copyright holder of the video content) who uses the video processing server 212 to process video content the third party owns, controls, or has been contracted to tag and creates area tags to identify locations available for the product placements. In another example configuration, an entity that is providing the product placements may control the video processing server 212 and direct the video processing server 212 to process video content in order to generate the area tags. In a further alternative example, the video content may be stored in a format that is pre-processed to include the area tags before storage of the video content in the video storage network 210. Where the area tags are already contained in the video content, the video content may be sent directly from the video storage network 210 to the content server and/or the video personalization module 216. The video processing server 212 may be located on a computer network that is local to the content server, or the video processing server 212 may be located at a remote location from the content server. The video processing server 212 and content server 200 may communicate using the Internet, a WAN, LAN or similar network communication channels.

The content server 200 may receive a product placement request associated with an area tag and the video content. In one instance, the request may be associated with just one area tag. In another instance, the request may be a batch request associated with multiple area tags in the video content. When multiple area tags are received, then product placements can be selected for the multiple area tags in a batch mode.

A video personalization module 216, upon receipt of a request, may select a product placement for display in the video content. The product placement selected may be personalized based in part on the user profile associated with client device and/or the viewer, which may be stored in a personalization data store 222. The user profile elements described above may also be contained in the user profile for a viewer (or requesting individual) of the video content. In one example configuration, the user profile may be accessed by requesting customer segment information associated with the user profile from the personalization data store 222 using identification information or the authentication credentials associated with the user profile. Specifically, Boolean data or other compressed data may be received about whether a customer is an early product adopter, luxury purchaser, mother, voracious reader, etc. Where a user profile is not available, a demographic profile may be provided as a best guess for what the user profile may be. In one example arrangement, the video personalization module 216 may receive a product placement tag or product placement identifier (ID) when selecting a product placement based on the user profile, as requested from the product placement data store 218.

In an alternative configuration of the video personalization module 216, the product placement may be selected and a product placement tag may be obtained based on information solely provided by the area tag. In this instance, product placements stored in the product placement data store 218 may be identified that correlate with the constraints provided in the area tag. As mentioned before, a product placement can also be obtained based on a combination the user profile and the area tag or portions thereof.

More specific examples of product placements which may be added to video content may be: a product package in a video scene, a billboard placed on a flat area in a video scene, a product overlay where a replacement product container covers an existing product container, a logo on clothing, an advertisement, 3D (three-dimensional) rendered image, brand imagery, logos, text, images, video content, games, rich media, etc. A product placement may also be an animated placement such as: an animated character, an animated corporate mascot, an animated corporate logo, a rotating sign, or varying lighting on a product. The product placement may even be a sub-video that is designed to fit into the content.

The video module 230 in the content server 200 may send video content and the product placement tag for the video content to requesting devices. The product placement tag may be provided to requesting devices through a communication network 232 such as the Internet, a WAN, a LAN or similar network communication channels. For instance, the product placement or product placement tag may be sent to a client device 234 that is presenting the video content to the end user or to a device that is incorporating the product placements into the video content for later viewing.

Using the product placement tag (e.g., identifier) received from the content server 200 or video module 230, the client device 234 may request the product placement from a product placement media server 260. The actual product placement media (e.g. visual, audio or text content) for the product placement to be displayed to the user may be retrieved from the product placement media data store 265 by the product placement media server 260.

The client device 234 may also receive video content directly from the video storage network 210 or video content may be received through the content server 200. In one example, the product placement media server 260, via which the product placement media may be requested, may be controlled or owned by a third party product placement company, advertising network company or advertising party. The product placement may then be incorporated into the video content on the client device as defined by the area tag. More specifically, the product placement may be overlaid or placed into one or more frames of the video content at the location and during the time period defined by the area tag. In another example configuration, the client device 234 may access the personalization data store 222 and area tag data stores 214 directly to access the user profiles and video tags directly.

In an alternative configuration, the client device 234 rendering the video content can send product placement requests to the content server 200 as the client device 234 is rendering the content in order to obtain the product placement tags. In addition, if the video content has a header with the desired area tags, multiple product placement requests based on area tags contained in the video content header can be sent to the content server 200 to obtain multiple product placement tags for the multiple product placements.

In another example configuration, the client device 234 may receive video content from the video module 230 with some product placements already incorporated into the video and other incomplete product placements that may be rendered by client device 234. In a further example, a completed video content file containing the product placement already incorporated into the video content may be downloaded to a client device 234 for viewing by a user.

The product placement media store 260 may employ a real time bidding system (RTB) to select a product placement. For example, a request sent from the client device 234 to the product placement media server 260 may identify a product placement class based on the user profile and the area tag, as opposed to identifying a single specific product placement. The product placement class request may be sent to the product placement media server 260 that allows advertisers to bid for the product placement slot. Bidding may be based on the media content category (e.g., video type), quality of the impression, time of day, context of the placement in the content, and other similar criteria. In an RTB system, the highest bidding party may win the product placement, and the product placement media associated with that winning party may be retrieved from the product placement media data store 265 and sent to the client device 234 for placement into the video content. As a specific example, if the selected area tag indicates that a vehicle product placement is desired at the location defined by the area tag, then instead of retrieving a specific product placement (e.g., a specific car manufacturer's product placement) to the client device 234, a product placement bid may be sent that allows the interested parties to bid for the product placement. The winning party's (e.g., winning car manufacturer's) product placement may then be sent to the client device 234 for incorporation into the video content.

According to another example, the product placement selection may be further optimized based on user responses to previously displayed product placements. User feedback where the user explicitly states whether the product placement appealed to the user may also be used in selecting future product placements.

Incorporation of the product placement into the video content is optional for the client device 234. If a matching product placement may not be accessed due to an unavailable server, product placement problem, or lack of a product placement match, then the client device may not incorporate any product placement for the area tag. Alternatively, a blank mask that matches the video content may be provided to cover an undesirable product placement that already exists in the video content.

An impact event module 240 may record an impact event representing a viewer's actions in response to viewing the product placement in the video content. The impact event may include any number of viewer actions taken in response to consuming the product placement. Whether an action a viewer takes meets the criteria for an impact event may be defined by how close in time the viewer's action occurs relative to the viewing of the product placement. Consequently, an impact period may be a defined time period after a product placement has been displayed during which an impact event may be recorded. Using an impact period may link a viewer's actions together in time with the product placement, and the use of the impact period may also filter out the recording of user actions that are not likely to be a result of viewing an advertisement.

A relationship between impact events and product placements may be evaluated to determine whether or not an impact event is related to the product placement recently displayed in video content shown to the user. In other words, an impact event may be recorded when a content relationship is identified between the potential impact event and the product placement. For example, if a user event is recorded after the product placement has been displayed, that is related to the product placement, then the user event may be considered an impact event. User events may be, but are not limited to, conducting a search or query that includes one or more words related to a recently displayed product placement or posting a social media message that is related to a product placement recently displayed in video content shown to the user. When user events related to a product placement occur then an impact event may be recorded. For example, if the product placement was related to a specific shoe brand and the user searches for or accesses online content related to the specific shoe brand or shoes within a certain time period, then the user's action may be considered an impact event.

A user offer module 250 may be configured to send promotional offers to a client device 234 over a communication network 232. Examples of a communication network include the Internet, a LAN, or a cell phone network. The user offer module 250 may send offers of product or service discounts, unique offers, luxury offers, bulk deals, or other promotions to the viewer of the product placement in the video content and these promotions may be related to the product placement. In addition, the promotional offers may be selected based on the impact events performed by the user after viewing product placements. For example, the technology may take into account the product placement displayed to the viewer and any associated impact events when selecting and sending the promotional offers. The consideration of the personalized product placements and/or impact events allows a highly targeted promotional offer to be sent to the viewer.

A media consumption history for a user's consumption of the video content may be recorded. This may include the recording when, where and how often a viewer is consuming video content. These historical records may help further define user profile knowledge about the user, such as the user's age, geographic demographics, and impact of advertisements versus the total number of videos viewed. The media consumption history may be stored in the personalization data store 222 (FIG. 2) for analysis.

In a further configuration of the technology, a prioritized list of the viewer's interests may be accessed from their user profile. The product placement may then start with high priority interests when personalizing a product placement. If a higher priority interest is not able to be used because a product placement is not available for the higher priority interest or another conflict arises, then lower prioritization interests may be identified to see what product placements fit into the video content. For example, a user's top interest (e.g., shoes), can be identified and may be used in selecting a product placement. However, if a product placement for the user's top interest is not available for the video content then a secondary interest (e.g., dresses) can be identified for use in selecting a product placement, and so forth.

In another example configuration, if video content passes through a third party's network (e.g., the video content passes over a cell phone carrier's network), the third party may decrypt the video content. The carrier may then delay the video content, and process the video content to find areas for product placement. Then the product placement may be overlaid onto the video content by the third party (e.g. carrier). Examples of this are product placements that are overlaid onto a video telephone call over a cell phone network or live video over a third party's network.

Figure 3:
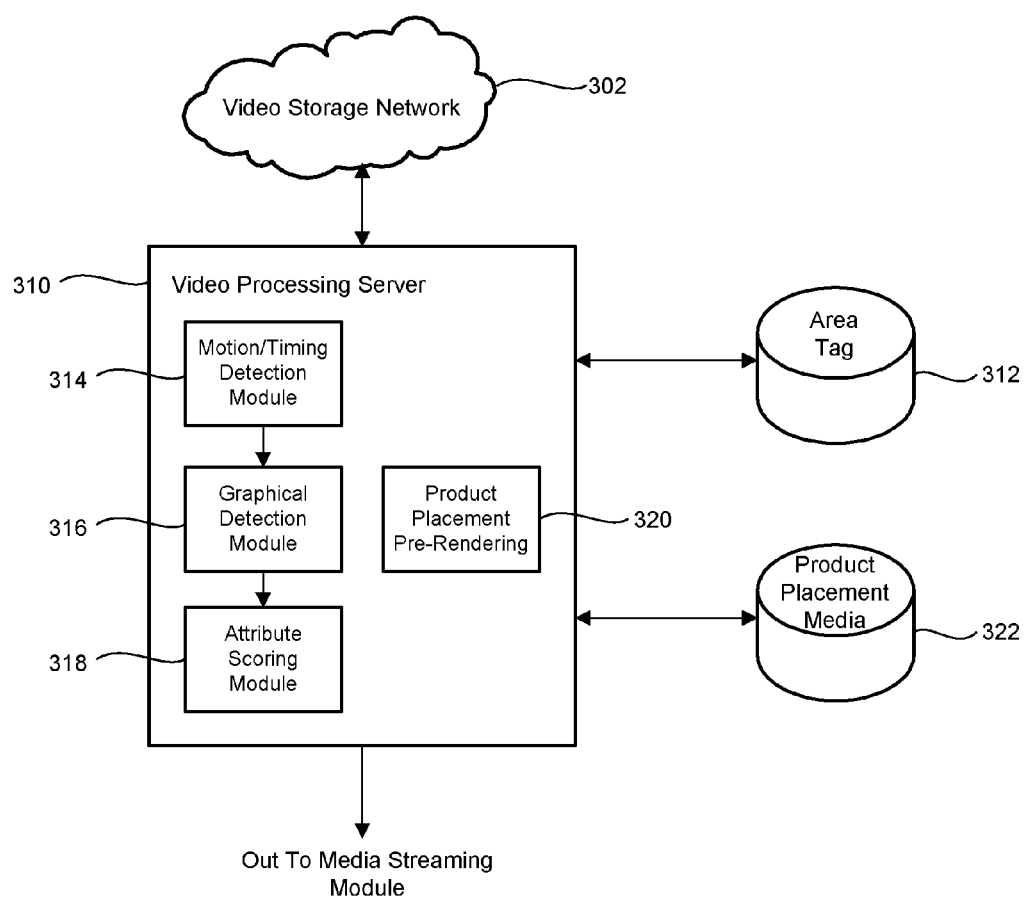
FIG. 3 is a block diagram illustrating an example of a video processing server and related components to provide a product placement in media content.

FIG. 3 illustrates further details of an example video processing server 310 (discussed as block 212 in FIG. 2). A motion and/or timing detection module 314 in communication with the video processing server 310 may be used to detect motion, scene timing, object movement, and related features in the video frames that may influence whether product placements are available. The motion may be detected using known motion detection methods. Examples of motion methods that may be used for detecting motion and motion magnitude in the video content include: analyzing differences in a series of video frames, tracking movement and speed of detected objects, or using other methods for analyzing similar elements of the image data. When a video scene or a portion of a video scene has a lower amount of motion or fewer changes in a scene, this may make the identified scene or scene portion more suitable for a product placement.

A graphical detection module 316 in communication with the video processing server 310 may be used to graphically scan video frames for graphical attributes. More specifically, the graphical detection module 316 may detect surface complexity, lighting, surface orientation, a legibility angle, and similar graphic attributes. Surface complexity may be detected using edge detection methods, gradient detection, and similar methods. Lighting levels in portions of the video content may be tested using defined thresholds as compared to desired lighting thresholds for the product placements in the video frames or by comparing lighting to previous video frames. Chroma key techniques (e.g. "green screen") may also be used for product placement in video content. Certain locations in video content may be captured using chroma key locations to allow for later product placements at those locations. Such chroma key locations may be identified by the graphical detection module 316 in the video content.

The graphical detection module 316 may also be able to scan and analyze video content to find occurrences of existing product placements, brands, advertisements, or slogans in existing video content. Image to text matching or matching of audio converted to text may also be performed. This type of comparison may be performed using image matching methods such as: OCR (optical character recognition), pattern recognition, accumulated signal gradient method, or other useful methods for matching images. In an example, a specific logo image or product image may be searched for in the video content, and the logo image may be compared to objects or features identified in video content frames. As a result, existing occurrences of products or advertisements in the video content may be tagged to enable tracking of the effectiveness of the product placements even in video content or media content where the product placement is pre-existing.

An attribute scoring module 318 may receive the detected information from the motion/timing detection module 314 and the graphic detection module 316 to score an area or area tag in a media frame for product placement suitability. The attribute scoring module 318 may generate attribute scores for the area tags (or media content tags) that may be sent to the area tag data store 312. The suitability of an area in a video frame may be determined using at least one visual attribute, comprising: lighting, motion speed, surface complexity, visibility duration and similar visual attributes. A better attribute score may mean that a better location has been found in the video content for a product placement, while a lower attribute score may mean that the location may be usable for a product placement but there are problems with the area of the video frame.

The scoring may provide a single numerical value or multiple scores that may be stored with the area tag for a detected location. Multiple scores may be provided where each type of score applies to different attributes for product placements. For example, a first score may apply to the suitability of an area tag for a planar type of advertisement, a second score may apply to suitability for a small object advertisement, a third score may apply to suitability for a large object placement, etc. While certain modules are illustrated in FIG. 3, the video processing server may contain other modules that are not illustrated, such as decompression modules, or other modules desired for graphics and video processing.

A product placement pre-rendering module 320 may be configured to pre-render product placements for the video processing server 310 to reduce latency in placing the product placements into the video content. For example, product placements may be fully rendered with outdoor lighting in advance to fit into outdoor lighting conditions or rendered to fit generically into the video content. This allows the product placements to be placed into the video content using a reduced amount of graphics processing power at video content play time. In addition, advertisements may be pre-rendered to fit certain types of geometrical formats including planes, squares, other polygons, cylinders and other known formats. The pre-rendered product placements may be stored in a product placement media data store 322.

The video processing server 310 may process video content in an offline mode, where the area tags are produced in advance of any viewer request. These area tags may then be stored in the area tag data store 312 using a data storage device. When the video content is requested for viewing then the pre-prepared area tags may be accessed. Alternatively, the area tags may be created as the video content is being retrieved for viewing from the video storage network 302 for viewing. In this on-demand configuration, the video content may be delayed by a number of seconds to provide time to create the area tags and identify the desired product placements. This allows the video content to be customized dynamically or "on-the-fly" using the delay technique described.

Figure 4:
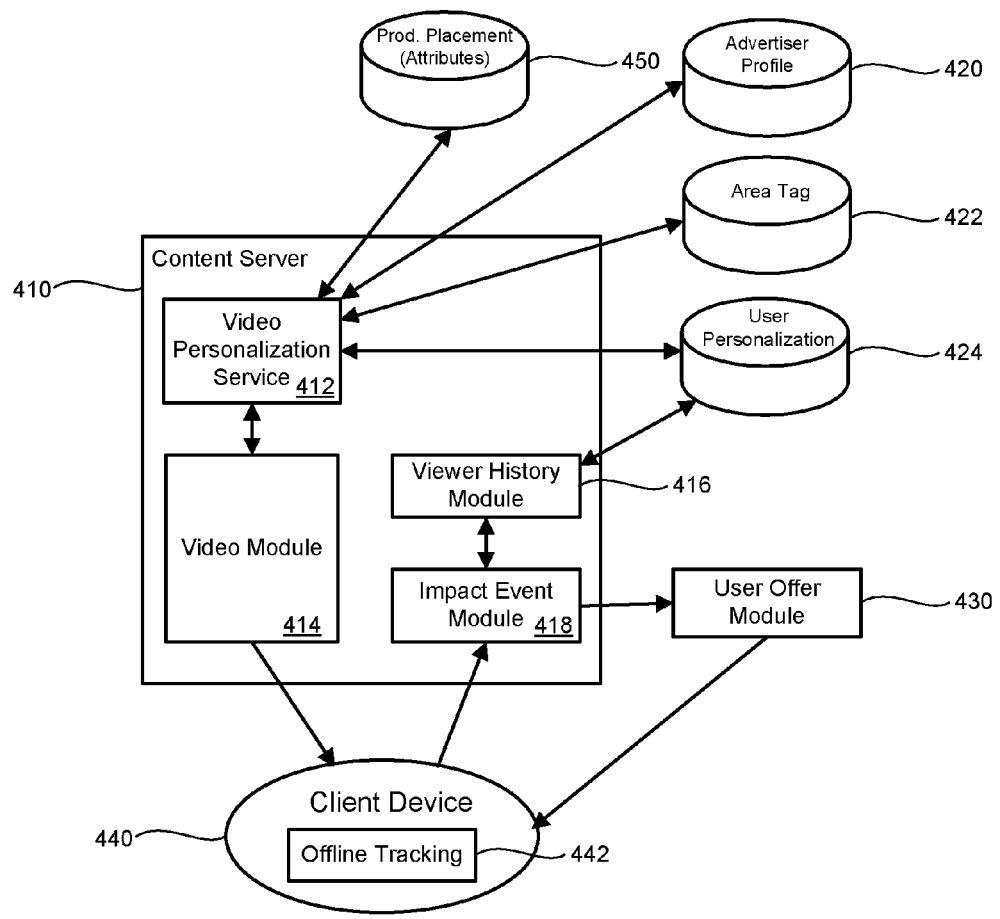
FIG. 4 is a block diagram illustrating a more detailed example of a content server and related components for providing a product placement in media content.

FIG. 4 illustrates a content server 410 (discussed as block 200 in FIG. 2) having an advertiser profile data store 420 containing advertiser profiles. An advertiser may be any entity sponsoring or associated with sponsoring a product placement for itself or on behalf of another entity (e.g., manufacturer, brand, private labeler, wholesaler, retailer, etc.). The advertiser profiles may include restrictions from an advertiser about video content types with which the advertiser does not want their product placement presented. For example, a children's toy manufacturer may want to restrict their product placements from being placed in movies with mature themes. In another example, the advertiser may not want a product placement in video content that does not fit desired demographics. Specifically, a product placement targeted to a male demographic may not fit in video content targeted to a female demographic. In an alternative configuration, an advertiser restriction may be stored in the area tag. The area tag may contain directions, rules, or restrictions about how an advertiser desires an advertisement to be placed. As a result, the product placement selection from the product placement data store 450 may be further constrained by either the advertiser profile or advertiser profile information an area tag stored in the area tag data store 422.

A viewer history module 416 may also be provided. The viewer history module 416 may record consumption attributes for a user's consumption of the video content. The user's consumption attributes may include, for example: when the video content was viewed, where the video content was viewed, and how often the video content was viewed. These consumption attributes may be stored in a user personalization data store 424 that is accessible to the content server.

The product placement data store 450 may contain product placement attributes to store specific attributes about the product placements. For example, the display size of the product placement, the competitors of a party supplying the product placement, the media content type, whether the product placement is for a tangible product or a service, dominant colors in the product placement, or other product placement attributes may be stored in the product placement data store. These attributes about the product placement may be used when selecting the product placement. An entity sponsoring a product placement (e.g., an advertiser) may have access to an interface or API that enables the entity to provide product placements, advertising, brand imagery, logos and the like to the product placement data store 450. The interface may include a web interface to receive manually entered product placements or an advertiser may use the automated API interface to upload multiple product placements. Product similarity data may also be stored in the product placement data store 450 regarding users who viewed and/or purchased item A and who also viewed and/or purchased items B, C, and D. Product placements may also be categorized or indexed as to product placements that appeal to certain segments of users.

The client device 440 may also contain an offline recording module 442 so the user's actions may be recorded when the client device is not connected to the Internet, a wired network, a wireless network, a cell phone network, or another network. This allows the user's actions with respect to viewing product placements in downloaded video content or the impact actions to be recorded offline. Then when a network connection becomes available again, these user's actions may be reported back to the impact event module 418. Similarly, the user offer module 430 may provide more targeted promotional offers once the offline information has reported back. The video module 414 and video personalization service 412 operate as previously described.

Figure 5:
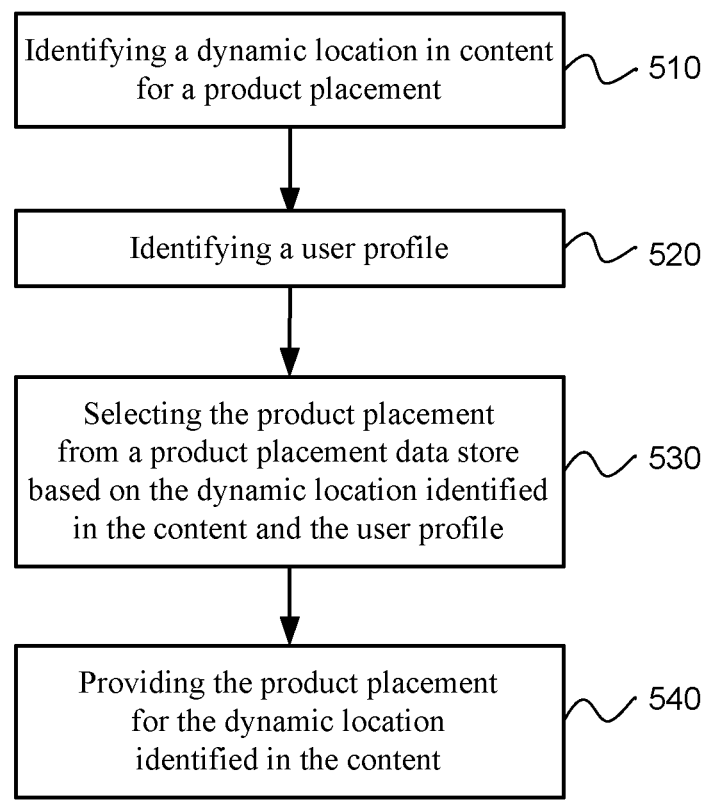
FIG. 5 is a flowchart illustrating an example of a method for product placement in media content.

FIG. 5 illustrates an example of a method for personalizing a product placement in content. The method may include the operation of identifying a dynamic location in the content available for the product placement, as in block 510. A dynamic location may be a location where a product placement (e.g., stationary) is dynamically displayed across multiple video frames, multiple audio segments or multiple text segments. For example, a dynamic location may be a product placement that is stationary relative to the other content (e.g., relative to the other objects or people in a video) through multiple frames of video but the dynamic location identifies a changing frame location across multiple video frames. In the more specific example case of a shoe that is a product placement, the shoe may be stationary but the shoe may be viewed from different camera angles which results in a different location for the shoe in successive video frames of content. In addition, the product placement may also be moving in the content. This identified dynamic location may be stored in a memory device such as RAM (Random Access Memory), Flash memory or another type of accessible memory for use while content is being processed and sent to a viewer. Alternatively, area tags may be created to store the locations identified in the content, and the area tags may be stored in an area tag data store. The area tags may store times and frame locations where product placements are available.

In another example, the area tags can be located in a manifest file at a beginning of the video content. The manifest can act as an ingestion manifest to indicate which files are available for download (e.g., the different versions of the movie), and the area tags may be included in the manifest too.

A user profile may be identified, as in block 520. The user profile may be identified by accessing the personalization data store that is located on a server or data storage system. Information may be identified in the personalization data store which may include customer segment values for the user profile of the user.

A further operation is selecting the product placement from a product placement data store based on the information (e.g., dynamic location) identified in the content and/or the user profile, as in block 530. The product placements, area tags, and advertisers may each have their own unique identifier. Information related to the user, the product placement, and the advertisers may be located and obtained using these unique identifiers. Users may also be identified via various methods, such as a unique login and password, a unique authentication method, an Internet Protocol (IP) address of the user's computer, an HTTP (Hyper Text Transfer Protocol) cookie, a GPS (Global Positioning System) coordinate, or using similar identification methods.

User information may also be obtained from third parties, such as social networks, micro-blogging sites, web blogs, and similar websites that may provide additional information about the user as well as information about others who are connected to the user socially. Social networks may provide information about brands, products and services that are of interest to the user and the user's friends. If the user or the user's friends identify with or express an interest in a particular brand, a product placement may be presented for that brand or product. If the user profile contains very little specific behavior or demographic information, then user information associated with other users believed to have similar attributes or behaviors (e.g., past purchase history, viewing behavior, etc.) may be used to select product placement for the user. For example, user information about demographic use located in the same or a similar geographic location as the current user may be used. The current geographic location of the user may be determined using an IP address, GPS coordinate, or radio telemetry.

The product placement may then be provided for the content and the dynamic location identified in the content, as in block 540. The product placement may be (e.g., product images or advertisements) placed or overlaid into the content (e.g., video content). The content or video content may be displayed to a user, who has requested the content, using a client device having computing resources and a video display device.

A score may be generated for a frame location in a frame of the content (e.g., video content) representing product placement suitability based on visual attributes. This score may be stored in the area tag as desired. The score may represent product placement suitability of the frame location based on visual attributes including: lighting, motion speed, surface complexity, and visibility duration, etc., as described earlier.

Figure 6:
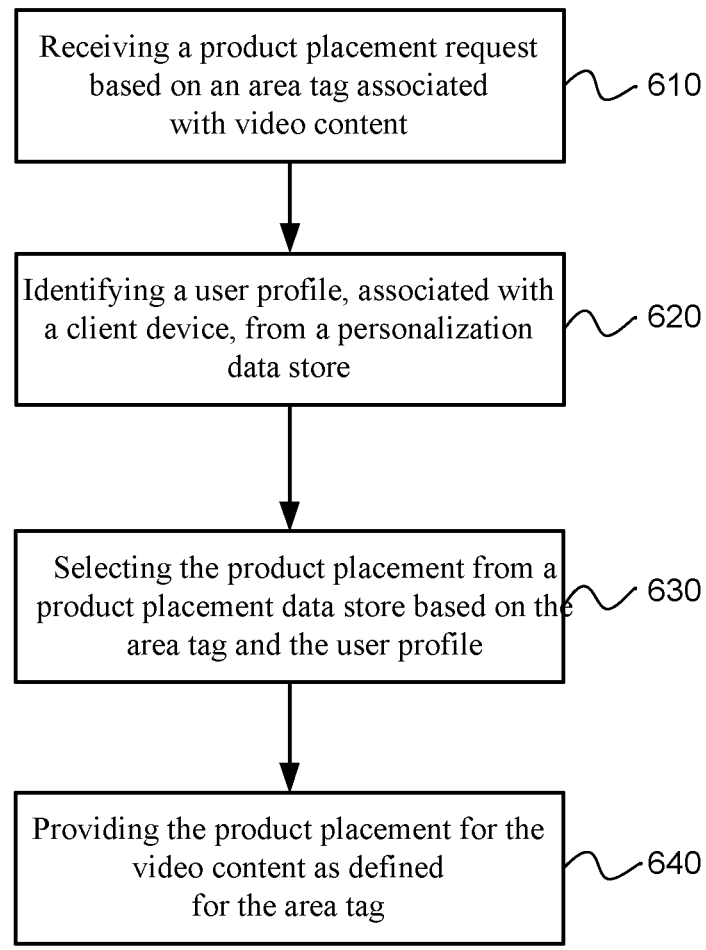
FIG. 6 is a flowchart illustrating an example of a method for providing product placement into media content.

FIG. 6 illustrates an example method for personalizing a product placement in video content. The method may include the operation of receiving a product placement request based in part on an area tag associated with video content, using a computing device having a processor and a memory, as in block 610. The creation of area tags may take place using a media processing module to associate the area tag with video content. The area tag may represent a location, time or time interval in the video content where product placement is available. The media processing module may be owned or controlled by: the party providing the product placement in the video content, by a content rights holder, or by a third party tagging service. The media processing module providing the tagging service may be located on a separate computing device or server having a processor and a memory. Alternatively, the media processing module may be integrated into the server providing the product placement.

A user profile associated with a client device displaying the video content and/or the viewer of the video content may be identified, as in block 620. The personalization data store may house the user profile and may be in communication with the computing device. In example configurations, the computing device may be a content server or a similar type of computing device.

A further operation may be selecting the product placement from a product placement data store based on the area tag and the user profile, as in block 630. The product placement store may be in communication with the computing device using a network communication interface, a local interface, or another storage communication interface. The user profile may contain personalization information selected from the group consisting of viewer preferences, product browsing activity, a product purchasing history, and other viewer related elements, as described earlier.

The product placement may be provided in the video content as defined by the area tag, using the computing device, as in block 640. For example, in response to identifying an area tag, a product placement tag may be sent to the client device. The product placement tag may cause the client device to retrieve the product placement from a product placement media data store or an advertising server. In some instances, the product placement may be cached locally on the client device itself. The product placement may be an overlay on a video frame at a time and video frame area defined by the area tag.

Video content created for the consumption of a viewer may be created in multiple ways using this technology. One example of video content preparation is video content that is fully rendered including the product placements for the viewer to download and then consume the video content offline. This allows the user to download video content with the product placements pre-loaded in the video content. A second example is a partially rendered video content where some product placements are placed in the video content before the video content is provided to the client device and other product placements are tagged to be dynamically loaded by the client device. A third example is where the video content has no product placements pre-loaded and each of the existing product placements are incorporated into the video content by the client device.

Figure 7:
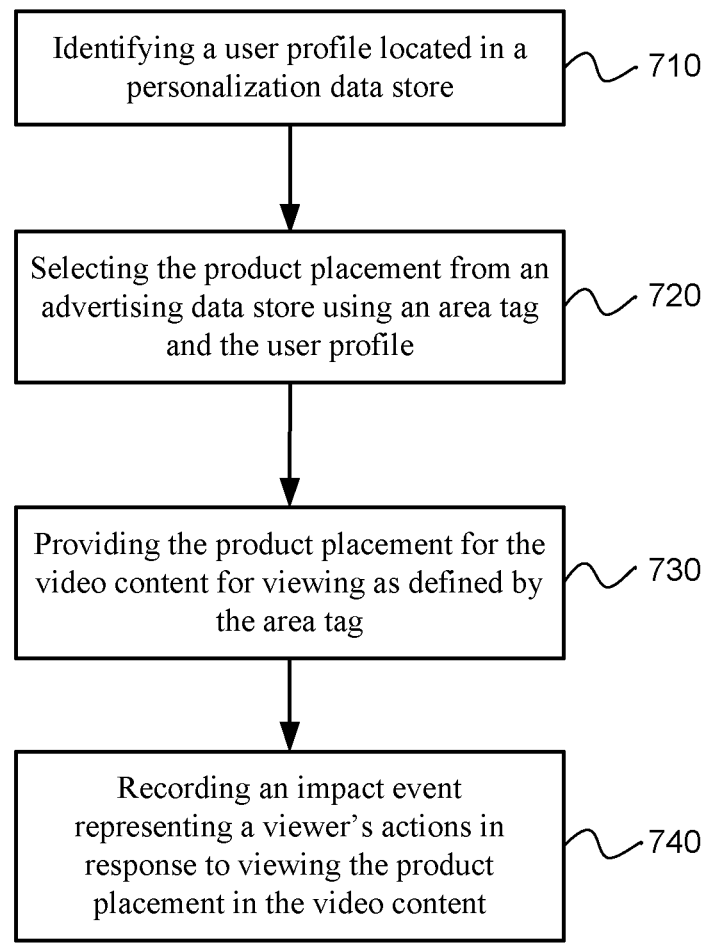
FIG. 7 is a flowchart illustrating an example of a method for providing product placement in media content and recording an impact event.

FIG. 7 illustrates an example of a method for recording or tracking an impact of a product placement in video content. The method may include identifying a user profile located in a personalization data store in communication with the computing device, as in block 710. A product placement may be selected from a product placement data store using an area tag and the user profile, as in block 720. The area tags may be created by tagging a location or portion of the video content. The area tag may represent a location in the video content where the product placement insertion is available. In another operation, the product placement may be provided for the video content as defined by the area tag, as in block 730.

An impact event may then be recorded representing a viewer's action in response to viewing the product placement in the video content, as in block 740. An impact event may be recorded during an impact period that is a defined time period after the product placement has been displayed, after viewing of the video content containing the product placement has been completed or after another selected beginning time for the impact period. In other words, an impact event may be recordable during a defined time period after the product placement has been consumed (e.g., the impact period). However, if an impact event is not identified as being related to the product placement during that time period, then the impact event may not be linked to the product placement. Thus, a defined time window following a product placement may be designated as an impact period during which an impact event may be associated with the product placement. For example, a one week time window may be chosen during which user events can be linked with product placements and identified as impact events. Events that occur earlier in the impact period may receive a greater weighting than impact events which occur later in the impact period. This impact period is to avoid recording user actions that are not related to the product placement and may be considered noise. Recording of an impact event may apply to any type of media content including a video, audio, or text.

Impact events may also be defined by being related to the topic, product or service in the product placement. Actions taken or events performed by a user that may be considered impact event candidates but are not related to the topic of the product placement may not be associated with the product placement. For example, if the viewer was presented with a soft drink product placement but the event that the user performed was related to travel, then the event may not be associated with the product placement because the event appeared to be unrelated.

The recording of impact events may be valuable to the providers of the product placements because the occurrence of an impact event may mean the product placement was effective and resulted in a conversion. As a result, an impact fee may be charged to an entity associated with the product placement when an impact event occurs. A central data store, such as the user profile data store, may keep track of everything that has been viewed by the user. The viewing data may be correlated with a data store that records other actions that a user may do, and reports may be generated showing what viewer behaviors viewing the product placements has led to.

Product analytics may be provided to the advertisers, manufacturers, service providers and others who are interested in the results of product placements. The product analytics may provide information about brand awareness, time between a product placement and an impact event, purchases as compared to product placements view, etc.

The ability to send promotional offers to a user as discussed earlier may also be affected by impact events. Targeted promotional offers may be based on the product placement, the user profile, and/or the impact event performed by a user. For example, a user who likes the color red, who was presented a product placement for shoes, and who looked at red shoes in a shopping search engine may be sent a purchase incentive for those red shoes.

Figure 8:
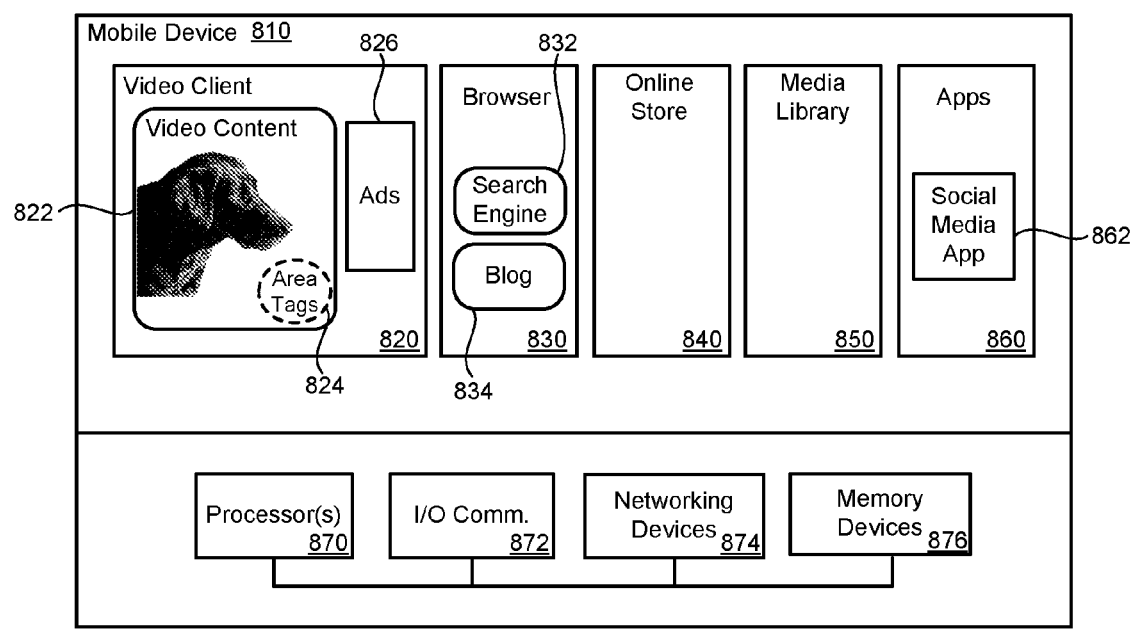
FIG. 8 is a block diagram illustrating an example of a mobile device.

FIG. 8 further illustrates a mobile device 810 or a client device. The mobile device 810 may be used to illustrate the types of impact events that may be recorded and tracked. In one example, the mobile device is a tablet device, a cell phone, a laptop computer, an electronic book reader, set-top box, game console or another mobile computing device. This mobile device 810 may have an operating system which has been distributed by the entity that is also supplying the product placements. This may simplify the ability to record the impact events. However, the impact events may also be tracked in devices where the operating system has been issued by the entity manufacturing the mobile device 810.

A video client 820 may be located on the mobile device 810. The video client 820 may receive streaming video, play downloaded video files, or playback video content stored on the client. The video content 822 that is presented to the viewer may have area tags 824 associated with the video content. These area tags describe where the product placement(s) may be incorporated into the video content by the mobile device 810. The mobile device 810 may retrieve the product placements from a product placement media server or advertising server and combine the product placements into the video content.

An impact advertisement 826 may also be presented in proximity to the video content being viewed. In one example, the impact advertisement is topically related to the product placement in the video content. In a second example, this impact advertisement 826 may also be used for supplemental advertising content. The supplemental advertising may promote a product or service that is not directly related to an advertising party's product placement. For example, an advertising party's most popular products or services, newly released products or services, products in a certain price range, complementary products, or products otherwise unrelated to the product placement may be displayed. The advertising party may select this supplemental advertising on its own, or the advertising may be selected by the entity providing the product placements. If the user clicks on or otherwise activates the impact advertisement, then an impact event may be recorded.

Other types of impact events may also be recorded. For example, a user accessing an online store 840, after the product placement has been viewed, to purchase the product in the product placement may be recorded as an impact event. The impact event may be directly recorded by the mobile device. Alternatively, the impact event may be identified at a later point in time by correlating the viewer's recorded action and data stored about the product placement the viewer watched. Similarly, an impact event may consist of the user conducting a search query on a search engine containing terms relevant to the product in the product placement. Another type of impact event may be a user accessing or exploring a brand or product category that is related to the product placement. Conversely, access to a competing brand may be considered an impact event.

Another type of impact event may be the purchasing of an upgrade related to the video content. For example, the video content being presented to the viewer may be a video trailer for a movie or other premium video content. During the trailer viewing or after the user views the trailer, a product placement may be presented to the user. This allows the user to purchase an upgrade related to the video content. For example, the upgrade may be a full length video, a premium quality video, additional program episodes, or another electronic upgrade promoted by the product placement may be purchased.

The purchase of a product through a physical (e.g., "bricks and mortar") establishment, after providing a product placement, may also be considered an impact event. For example, if data is recorded for a vehicle purchased at a vehicle dealership within a 30 day window of viewing a product placement, then this may be considered an impact event. An impact event may also be recorded when a user opens a map to determine a physical location where a product in the product placement may be purchased.

Activities within other websites that relate to the product placement may also be considered impact events. Placing comments in a website related to the product placement within the impact period in response to the product placement may be recorded. For example, the user may post a comment about the product placement which shows the impact of the product placement. Providing positive or negative feedback within the impact period in response to the product placement may also be recorded as an impact event. Accessing other content in a media library 850 such as a book, movie, song, or other media related to the product placement may be an impact event.

Impact events may also occur where a user accesses an application 860 related to the product placement. For example, a social media application or website may be opened and the user may perform an action in the social media application 862 related to the product placement. For example, a user may place a social media post that indicates the user "likes" a social media page related to the product placement. A product placement related social media posting by the user who viewed product placement may be another impact event. A related blog posting 834 may also be considered an impact event.

Another type of impact event may be identifying or recording a physical action or physical impact engaged in by a user in response to a product placement. More specifically, a physical location of a user in response to the product placement can be recorded. A physical location that is relevant to the product placement presented to the user may be recorded as an impact event. Examples of other recordable physical actions that may performed by a user in response to a product placement may include: traveling in a vehicle, taking a picture, providing hand signals or motion input to an optical computer input, walking, running, and other physical actions that may be in reaction to the product placement.

As an example of a physical action, an impact event may include recording a physical location of a user in a retail store related to the product placement. Where the user has viewed a shoe product placement for a specific brand, an impact event may be recorded when the user is identified at a shoe store generally or a shoe store known to sell the brand presented in the product placement. When a physical location of the user is identified during an impact period, the relevance of the location to the product placement may also be determined. If the relevance of the physical location to the product placement is considered to be high, then a larger weighting may be applied to the impact event. Where the relevance of the physical location to the product placement is considered to be lower, then a smaller weighting may be applied to the impact event. To identify the user's physical location, a mobile device may be used to obtain the location of a user wirelessly or via a wired network. Such wireless devices may include, but are not limited to, a cell phone, a tablet, a laptop computer, an electronic reader, or another mobile device that may supply physical location information. In another example, a product placement may be provided to encourage user to travel to a specific destination, such as theme park. When the user is identified as physically visiting the theme park in response to the product placement, then an impact event may be recorded.

FIG. 8 illustrates that the mobile device 810 may be a computing device or computing node that includes hardware processor devices 870, hardware memory devices 876, and Input/Output (I/O) device communication 872 to enable communication between hardware devices and I/O components. Networking devices 874 may also be provided for communication across a network with other nodes of the technology. The network device 874 may provide wired or wireless networking access for the mobile device 810. Examples of wireless access may include cell phone network access, Wi-Fi access, or similar data network access.

Figure 9:
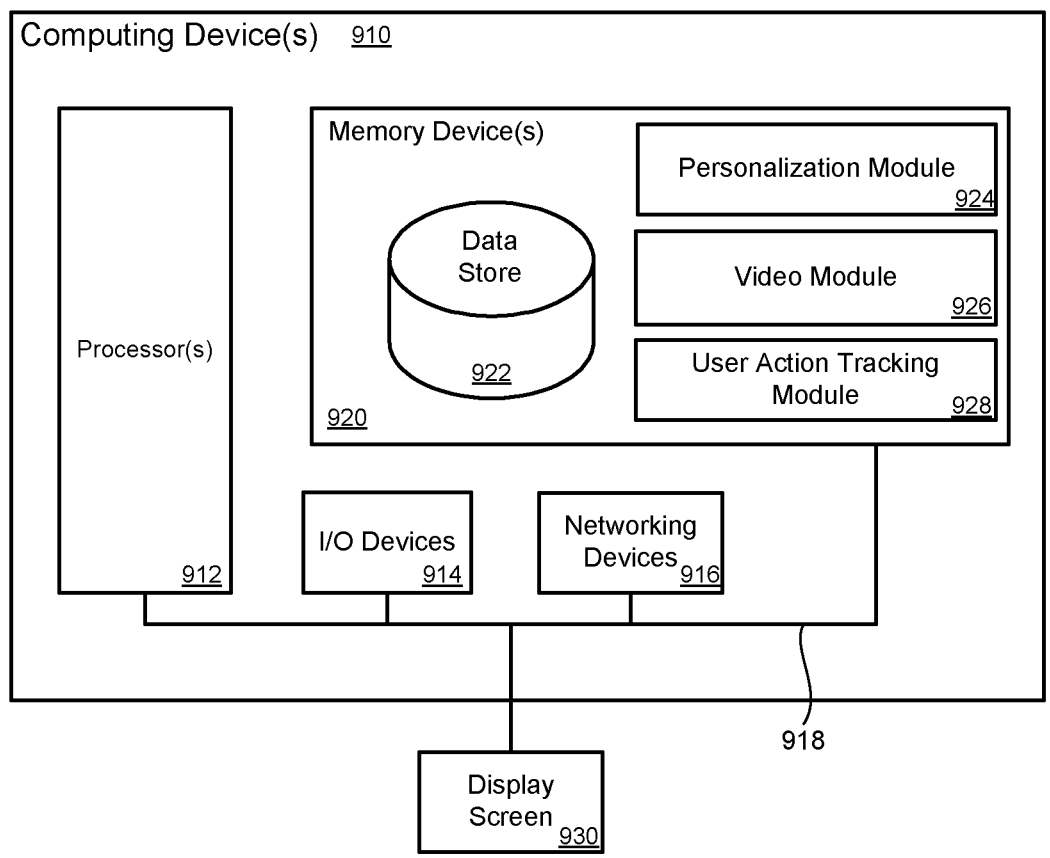
FIG. 9 is block diagram illustrating an example of a computing device for product placement in media content.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device may include a local communication interface 918 for the components in the computing device. For example, the local communication interface may be a local data bus and/or any related address or control busses as may be desired.

The memory device 920 may contain modules that are executable by the processor(s) 912 and data for the modules. Located in the memory device 920 are modules executable by the processor. For example, a personalization module 924, the video module 926, and the user action module 928, and other modules may be located in the memory device 920. The modules may execute the functions described earlier. A data store 922 may also be located in the memory device 920 for storing data related to the modules and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen 930 that is available to display output from the computing devices. Other known I/O device may be used with the computing device as desired. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium or computer readable storage device that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Reference has been made to the examples illustrated in the drawings, and specific language has been used herein to describe the same. It will nevertheless be understood that no limitation of the scope of the technology is thereby intended. Alterations and further modifications of the elements illustrated herein, and additional applications of the examples as illustrated herein, which would occur to one skilled in the relevant art and having possession of this disclosure, are to be considered within the scope of the description Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for personalizing a product placement in video content, comprising:
    receiving, from a client device, a product placement request based in part on an area tag associated with video content, the product placement request received by a computing device having a processor and a memory, and the video content being stored in a format that includes the area tags;
    identifying a user profile using authentication credentials associated with the user profile, the user profile comprising consumption attributes including: when the video content was viewed, where the video content was viewed, or how often the video content was viewed;
    selecting the product placement based on the area tag, the identified user profile and an advertiser profile of an advertiser involved in sponsoring the product placement, the advertiser profile including an advertiser restriction in the area tag restricting the product placement from selection based on the video content or the identified user profile; and
    providing the product placement to the client device for display in the video content as defined by the area tag, using the computing device.

2. The method as in claim 1, wherein the product placement is a product placement overlay on a video frame at a time and video frame area defined by the area tag.

3. The method as in claim 1, wherein the user profile contains personalization information selected from the group consisting of viewer preferences, browsing activity, and a purchasing history.

4. The method as in claim 1, further comprising tagging the video content with an area tag representing a location in the video content where the product placement is available.

5. The method as in claim 1, further comprising delivering the product placement to the client device separately from the media content for insertion into the video content by the client device.

6. The method as in claim 1, further comprising retrieving the product placement and placing the product placement into the video content at the client device before the video content is presented to a viewer.

7. The method as in claim 1, further comprising rendering the video content using the client device, and sending product placement requests to the computing device from the client device as the client device is rendering the video content.

8. A method for personalizing a product placement in content, comprising:
   identifying a dynamic location in the content available for the product placement using a computing device having a processor and a memory;
   storing the content in a format that identifies the dynamic location; identifying a user profile using authentication credentials associated with the user profile;
   selecting the product placement based on the dynamic location identified in the content and the user profile, using the computing device;
   retrieving the product placement from a product placement data store based on an advertiser profile of an advertiser involved in sponsoring the product placement, the advertiser profile including an advertiser restriction in an area tag associated with the content to restrict how or where the product placement is placed;
   constraining how the product placement may be placed in the content based on the advertiser restriction in the advertiser profile; and
   providing the product placement for the dynamic location identified in the content.

9. The method as in claim 8, further comprising retrieving product placement media from a product placement media data store using a client device and placing the product placement media into the content using the client device.

10. The method as in claim 8, wherein the product placement is provided for the content based on information provided by an end user in the user profile or user product purchases.

11. The method as in claim 8, further comprising recording consumption attributes of a user's consumption of the content including: when the content was viewed, where the content was viewed, and how often the content was viewed.

12. The method as in claim 8, wherein the content is audio content or text content.

13. The method as in claim 8, wherein identifying a dynamic location in the content for a product placement further comprises detecting a time and location in the content available for a product placement to create an area tag associated with the content.

14. The method as in claim 13, further comprising generating a score for the dynamic location in the content, the score being a numerical value representing product placement suitability based on visual attributes, and storing the score in the area tag.

15. The method as in claim 14, further comprising generating the score representing product placement suitability of a frame location based on motion speed.

16. A non-transitory machine readable storage medium, including program code, when executed to cause a machine to perform the method of claim 8.

17. A system to provide a product placement in media content, comprising:
   a server to receive the media content, the server having a processor and memory;
   a media processing module, in communication with the server, to identify a media content tag defining an area of the media content available for a product placement;
   a personalization module, in communication with the server, to select a product placement which is personalized using a user profile and an advertiser profile, the advertiser profile including an advertiser restriction in the media tag restricting the product placement from selection or constraining how the product placement may be placed in the media content; and
   a media module in the server to provide the product placement for the media content as defined by the media content tag, and the product placement is delivered to a client device for incorporation into the media content client device.

18. The system as in claim 17, wherein the personalization module further comprises a video personalization module to select a product placement tag from a product placement data store using the user profile.

19. The system as in claim 17, further comprising providing the product placement for the media content as personalized based on a user profile containing an internet browsing history or tracked user interests.

20. The system as in claim 17, further comprising an attribute scoring module to score an area in a content frame as a numerical value representing advertisement suitability using visual attributes selected from the group consisting of motion speed and surface complexity.

21. The system as in claim 20, further comprising a graphical detection module to scan frames for graphical attributes.

* * * * *